US012656134B2

(12) United States Patent
Wang et al.

(10) Patent No.: US 12,656,134 B2
(45) Date of Patent: Jun. 16, 2026

(54) MOBILE INTERACTION DEVICE, TERMINAL DEVICE AND MOBILE INTERACTION SYSTEM

(71) Applicant: HONDA MOTOR CO., LTD., Tokyo (JP)

(72) Inventors: Kailun Wang, Beijing (CN); Yang Bai, Beijing (CN); Lijuan Yan, Beijing (CN); Xizi Gu, Beijing (CN); Axita, Beijing (CN)

(73) Assignee: HONDA MOTOR CO., LTD., Tokyo (JP)

( * ) Notice: Subject to any disclaimer, the term of this patent is extended or adjusted under 35 U.S.C. 154(b) by 126 days.

(21) Appl. No.: 18/385,942

(22) Filed: Nov. 1, 2023

(65) Prior Publication Data

US 2024/0142246 A1     May 2, 2024

(30) Foreign Application Priority Data

Nov. 2, 2022     (CN) .......................... 202211361885.9

(51) Int. Cl.
| | |
|---|---|
| *B60W 50/00* | (2006.01) |
| *B60W 30/182* | (2020.01) |
| *B60W 40/06* | (2012.01) |
| *G01C 21/00* | (2006.01) |
| *G01C 21/34* | (2006.01) |
| *G01C 21/36* | (2006.01) |
| *H04W 24/00* | (2009.01) |
| *H04W 24/02* | (2009.01) |

(52) U.S. Cl.
CPC ....... *G01C 21/3461* (2013.01); *B60W 30/182* (2013.01); *B60W 40/06* (2013.01); *B60W 50/0098* (2013.01); *G01C 21/362* (2013.01); *H04W 24/02* (2013.01); *B60W 2050/0083* (2013.01); *B60W 2552/05* (2020.02); *B60W 2556/50* (2020.02)

(58) Field of Classification Search
CPC ............. G01C 21/3461; G01C 21/362; B60W 30/182; B60W 40/06; B60W 50/0098; B60W 2556/50; B60W 2552/05; B60W 2050/0083; H04W 24/02
USPC ......................................................... 701/423
See application file for complete search history.

(56) References Cited

U.S. PATENT DOCUMENTS

| | | | | |
|---|---|---|---|---|
| 2009/0005073 A1* | 1/2009 | Shaffer | .................. | G01C 21/20 |
| | | | | 455/445 |
| 2020/0245160 A1* | 7/2020 | Chu | ..................... | H04L 41/0893 |
| 2021/0374836 A1* | 12/2021 | Bronicki | ................ | H04N 7/181 |
| 2022/0245596 A1* | 8/2022 | Nagata | ............... | G06Q 10/1093 |
| 2024/0077319 A1* | 3/2024 | Mutangana | ........... | H04W 72/56 |

* cited by examiner

*Primary Examiner* — Tiffany P Young

(74) *Attorney, Agent, or Firm* — Amin, Turocy & Watson, LLP

(57) ABSTRACT

A mobile interaction device, inclusive of a route determination module that determines a driving route of a moving vehicle on which a user is present based on interaction information, communication quality information related to a location, and road information.

14 Claims, 5 Drawing Sheets

MOBILE INTERACTION DEVICE, TERMINAL DEVICE AND MOBILE INTERACTION SYSTEM

CROSS-REFERENCE TO RELATED APPLICATION

Priority is claimed on Chinese Patent Application No. 202211361885.9, filed on Nov. 2, 2022, the contents of which are incorporated herein by reference.

BACKGROUND OF THE INVENTION

Field of the Invention

The present invention relates to the field of information technologies, in particular, to a mobile interaction device, a terminal device and a mobile interaction system.

Description of Related Art

With the process of urbanization, the development of communication technologies and the accelerated pace of people's lives, there is a need for people to participate in various online conferences, such as video or voice, and to make calls or other information interactions while they are travelling on or driving various kinds of transportation or other vehicles.

In general, users travelling in or driving vehicles and other means of transport attend an online conference or make a call and other information interactions through devices such as a personal terminal or a laptop computer. However, the need to drive a vehicle and the limitations of the vehicle environment lead to problems such as inconvenient use and poor interaction.

A number of technologies and devices have emerged to support online conference while on the move and in-car telephony, for example, accessing and participating a mobile conference and a telephony via an in-vehicle terminal and an in-vehicle device.

It should be noted that the above description of the background of the invention is only set forth for the purpose of facilitating a clear and complete description of the technical solutions of the present invention and facilitating the understanding of those skilled in the art. It cannot be assumed that the above technical solutions are known to those skilled in the art merely because they are set forth in the background of the invention.

SUMMARY OF THE INVENTION

The inventors have found that the prior art for supporting mobile conferences and in-vehicle telephony usually considers meeting the basic hardware requirements for a mobile conference and a call, such as providing hardware devices such as video, audio, and the like required for the conferences and calls, but does not consider problems such as interruptions, delays, and the like of the conferences or calls due to the unstable communication quality while the vehicle is moving, which affects the effectiveness of the interactions such as a conference or a calls and thus affects the user's experience of using the vehicle.

In order to solve at least one of the above mentioned problems of the prior art, a mobile interaction device, a terminal device and a mobile interaction system are provided in embodiments of the present invention, to determine a driving route of the moving vehicle where a user is present on the basis of an interaction information, a communication quality information related to the location, and a road information, i.e., in determining the driving route, the communication quality and road information during driving are taken into account, and the interaction information is combined, so that the interaction effect during the mobile interaction can be ensured, and factors such as the traffic efficiency are taken into account, so as to provide the user with a reasonable driving route that is suitable for mobile interaction and improve the user's experience.

According to first aspect of the present invention, a mobile interaction device is provided, which comprises a route determination module configured to determine a driving route of a moving vehicle on which a user is present based on interaction information, a communication quality information related to a location, and road information; and a communication module configured to perform interacting information with outside of the moving vehicle.

According to second aspect of embodiments of the present invention, the interaction information includes at least one of interaction time information and interaction priority information, and the communication quality information includes at least one of road type information between a current location and a destination of the moving vehicle, and base station distribution information.

According to third aspect of embodiments of the present invention, the road type information includes: at least one of an elevated road, a tunnel, a mountain road, a bridge, a bridge arch, and a strong interfering place.

According to forth aspect of embodiments of the present invention, the route determination module adjusts a weight of the communication quality information and the road information in determining the driving route based on at least one of the interaction time information and the interaction priority information.

According to fifth aspect of embodiments of the present invention, the route determination module further determines the driving route on the basis of autonomous driving road information.

According to sixth aspect of embodiments of the present invention, the mobile interaction device further comprises a driving mode switching module configured to switch a driving mode of the moving vehicle based on the interaction information.

According to seventh aspect of embodiments of the present invention, the mobile interaction device further comprises an interacting mode switching module configured to switch an interaction mode based on a current communication quality of the communication module and/or a prediction result of a communication quality of the communication module.

According to eighth aspect of embodiments of the present invention, the mobile interaction device further comprises a proposal module configured to send a proposal message to attendees other than the user based on a current communication quality of the communication module and/or a prediction result of a communication quality of the communication module, the proposal message being including at least one of a switching of an interaction mode, an interaction interruption, an interaction interruption reason, and an estimated recovery time.

According to ninth aspect of embodiments of the present invention, the mobile interaction device further comprises a device adjustment module configured to adjust a device for interaction in the moving vehicle based on the interaction information, wherein the device for interaction being including at least one of a seat, a window, a curtain, a light, a display, a projector, a head up display (HUD), a speaker, a microphone and a camera.

According to tenth aspect of embodiments of the present invention, a terminal device for a moving vehicle is provided which includes the mobile interaction device according to any one of aspect one to aspect nine.

According to eleventh aspect of embodiments of the present invention, a mobile interaction system is provided which includes a terminal device for a moving vehicle, and a server. The terminal device for a moving vehicle uploads a current location information and destination information to the server. The server determines a communication quality information related to a location and road information based on the current location information and the destination information of the moving vehicle and sends the communication quality information and the road information to the terminal device for the moving vehicle. The terminal device for a moving vehicle determines a driving route of the moving vehicle on which a user is present based on interaction information, the communication quality information related to the location and the road information.

According to twelfth aspect of embodiments of the present invention, a mobile interaction system is provided which includes a terminal device for moving vehicle, a first server and a second server. The terminal device for a moving vehicle uploads interaction information, current location information and destination information to the first server. The first server sends the current location information and the destination information of the moving vehicle to the second server. The second server determines communication quality information related to a location and road information based on the current location information and the destination information of the moving vehicle and sends the communication quality information and the road information to the first serve. The first server determines a driving route of the moving vehicle on which a user is present based on the interaction information, the communication quality information related to the location and the road information and sends the driving route to the terminal device for moving vehicle.

One of the beneficial effects of embodiments of the present invention is that: a driving route of the moving vehicle on which the user is present is determined on the basis of interaction information, communication quality information related to the location, and road information, i.e., in determining the driving route, the communication quality and road information during the driving process are taken into account, and the interaction information is combined, so that the interaction effect during the mobile interaction can be ensured, and factors such as the traffic efficiency are taken into account, so as to provide the user with a reasonable driving route that is suitable for mobile interaction and improve the user's experience.

Furthermore, the interaction information for determining the driving route includes at least one of interaction time information and interaction priority information, and the communication quality information includes at least one of a road type information between a current location and a destination, and base station distribution information, such that the considerations in determining the driving route is further specified and the reasonableness of the driving routes determined is further improved.

Furthermore, the weight of the communication quality information and the road information are adjusted in determining the driving route on the basis of at least one of the interaction time information and the interaction priority information. That is, the weights of those two factors are adjusted on the basis of the interaction time and/or the interaction priority.

For example, the mobile interaction comprises a mobile conference and a mobile call, increasing the weight of the communication quality information when the conference or call is an important conference or important call, and increasing the weight of the road information when the conference is a non-important conference or a non-important call, so that the reasonableness of the driving route can be further improved;

Another example is to consider the interaction start time as the start time for considering the communication quality information when determining the driving route, and to consider the interaction end time as the end time for considering the communication quality information when determining the driving route, and thereby, adjusting the driving route. Accordingly, the communication quality information is considered during the interaction for determining the driving route, and the factor of the communication quality information is removed at the end of the interaction for adjusting the driving route, such that the reasonableness and the flexibility of the driving route can be further improved.

Furthermore, the driving route may also be determined according to the autonomous driving road information, such that the user experience can be further enhanced as the autonomous driving road facilitates the user to take part in the mobile interaction.

Furthermore, the driving mode can be switched according to the interaction information, for example, to a smooth style driving mode during the mobile interaction, which can further enhance the interaction effect and user experience.

Furthermore, the interaction mode may also be switched according to the current communication quality and/or the prediction result of the communication quality, for example, automatically switching the video interaction mode to the audio interaction mode when the communication quality is poor or the prediction is about to become poor, which can reduce the possibility of a sudden interruption of the interaction or a serious lag, and further improve the user experience.

Furthermore, a proposal information is sent to attendees other than the user on the basis of the current communication quality and/or the prediction result of the communication quality. For example, the proposal message includes at least one of a switching of an interaction mode, an interaction interruption, an interaction interruption reason, and an estimated recovery time. This further enhances the user experience by being able to alert other attendees when interactions are abnormal or predictions are likely to be abnormal. In this way, it can provide a comprehensive support for mobile interaction and further enhance the interaction effect and user experience.

Furthermore, the various devices for interaction may be adjusted on the basis of the interaction information. For example, the device for interaction includes at least one of a seat, a window, a curtain, a light unit, a display, a projection unit, a head up display (HUD) unit, a speaker, a microphone and a camera.

With reference to the latter description and the accompanying drawings, embodiments of the present invention are disclosed in detail. It should be understood that the embodiments of the present invention are not thereby limited in scope. Within the scope and terms of the appended claims, embodiments of the present invention include many changes, modifications and equivalents.

Features described and/or illustrated with respect to one embodiment may be used in the same or similar manner in one or more other embodiments, in combination with features in other embodiments, or in place of features in other embodiments.

It should be emphasized that the term "includes/contains/has" is used herein to refer to the presence of a feature, integral part, or component, but does not exclude the presence or addition of one or more other features, integral parts, or components.

BRIEF DESCRIPTION OF THE DRAWINGS

The foregoing and other objects, features and advantages of embodiments of the present invention will become more apparent from the following detailed description in conjunction with the accompanying drawings, in the accompanying drawings.

DETAILED DESCRIPTION OF THE INVENTION

With reference to the accompanying drawings, the foregoing, as well as other features of the present invention, will become apparent by the following specification. In the specification and the accompanying drawings, particular embodiments of the present invention are specifically disclosed which indicate some of the embodiments in which the principles of the present invention may be employed, and it is to be understood that the present invention is not limited to the embodiments described, but includes the full range of modifying variations, as well as equivalents, which fall within the scope of the appended claims.

The mobile interaction device of an embodiment of the present invention is described below in conjunction with the accompanying drawings.

Embodiment 1

A mobile interaction device is provided in embodiment 1 of the present invention.

Figure 1:
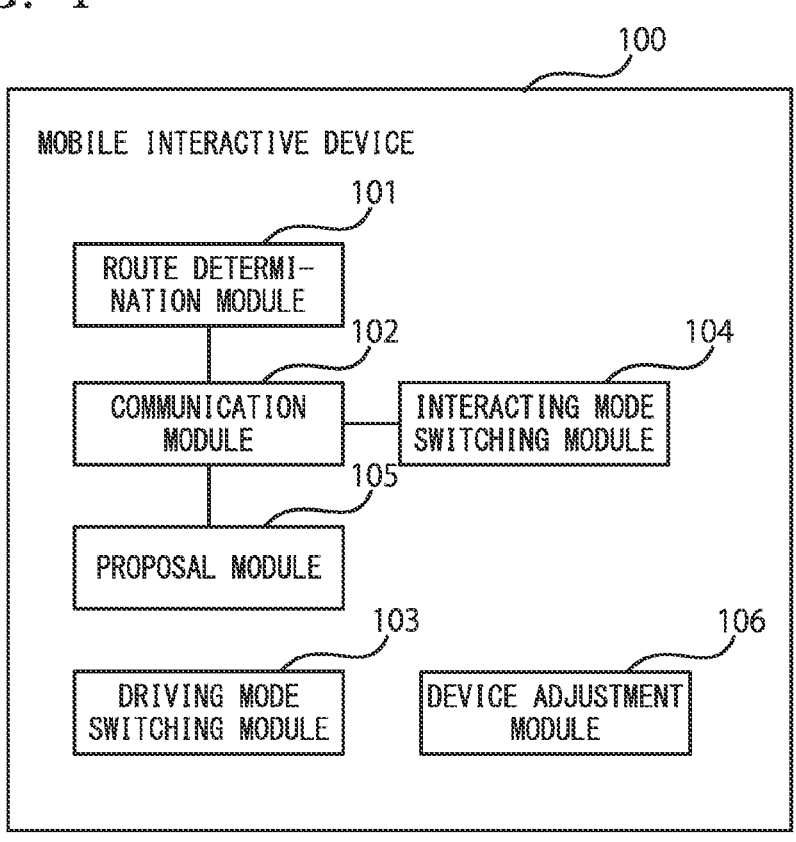
FIG. 1 is a schematic diagram of one embodiment of the mobile interaction device of embodiment 1 of the present invention.

FIG. 1 is a schematic diagram of one embodiment of the mobile interaction device of embodiment 1 of the present invention. As shown in FIG. 1, the mobile interaction device 100 comprises: a route determination module 101, determining a driving route of the moving vehicle where a user is present, on the basis of an interaction information, a communication quality information related to the location, and a road information; and a communication module 102, interacting information with the exterior of the moving vehicle.

By such a way, a driving route of the moving vehicle where the user is present is determined on the basis of an interaction information, a communication quality information related to the location, and a road information, i.e., in determining the driving route, the communication quality and road information during driving are taken into account, and the interaction information is combined, so that the interaction effect during the mobile interaction can be ensured, and factors such as the traffic efficiency are taken into account, so as to provide the user with a reasonable driving route that is suitable for mobile interaction and improve the user's experience.

In some embodiments, the mobile interaction refers to various information interaction activities with other users, such as a mobile conference, a mobile call, and other forms of information interaction, performed by a user driving or riding in a moving vehicle during a journey of the moving vehicle.

In some embodiments, the moving vehicle may be a variety of means capable of carrying a person for travelling, such as various types of vehicles, e.g., a vehicle, a ship, an aircraft and the like.

In some embodiments, the moving vehicle may also be referred to as a moving object or a transport vehicle or a carrier or a man-carrying vehicle, and so on. In the embodiments of the present invention, a vehicle is illustrated as an example, however, the present invention is applicable to a variety of moving means of transport capable of carrying a person.

For example, the vehicle may be various types of vehicles, such as a car or an electric or hybrid vehicle; also, for example, a private car, a bus, a coach, a lorry, a truck, a motorbike, an excursion vehicle and the like; and also, for example, a driverless car or a self-driving car and the like.

In some embodiments, the mobile interaction comprises a mobile conference and a mobile call, the mobile conference being a variety of online conferences that the user attends while driving or travelling on the moving vehicle, and the mobile call being a variety of calls that the user makes with an exterior while driving or travelling on the moving vehicle, including an active dial-out call and a passive access call.

In some embodiments, the mobile interaction may be in the form of a video interaction or an audio interaction, or may be switched between a video interaction and an audio interaction. For example, a video conferencing or an audio conferencing, a video call or an audio call. For the video interaction, a device such as a camera, a microphone and a speaker inside the moving vehicle, e.g. inside the vehicle, may be used, and for the audio interaction, a device such as the aforementioned microphone and speaker may be used. In some embodiments, the mobile interaction device 100 may be provided in a terminal device of the moving vehicle, e.g., in an in-vehicle terminal. Alternatively, part of the modules of the mobile interaction device are provided in a server, and part of the modules are provided in a terminal device of the moving vehicle.

In the following, the functions of each module of this mobile interaction device 100 are described in detail.

A route determination module 101 determines a driving route of the moving vehicle where a user is present, on the basis of an interaction information, a communication quality information related to the location, and a road information.

That is, when determining the driving route of the moving vehicle where the user is present, it is determined by combining many kinds of factors, such as an interaction information, a communication quality information related to the location, and a road information.

In some embodiments, determining a driving route of the moving vehicle where the user is present may be, either, determining the entire driving route from the departure location to the destination before or at the time of departure, or, alternatively, adjusting the driving route from a current location to a destination during driving.

For example, in the case where the interaction time is determined in advance, the entire driving route can be determined in advance, and in the case of temporary participation in an interaction, or that ending the interaction early or the interaction time is extended, etc., while driving, the driving route can be adjusted and updated according to the interaction information.

In some embodiments, the interaction information includes at least one of an interaction time information and an interaction priority information. To illustrate with the example of a mobile interaction being a mobile conference, accordingly, the interaction time information includes a conference time information and the interaction priority includes a conference priority.

For example, the conference time information includes a conference start time and a conference end time.

For example, the conference priority information includes a priority of "high", "medium", "low", or the conference priority information includes "important conference" or "non-important conference", and so on. The ranking of priorities may be determined on the basis of actual needs.

The mobile interaction is illustrated as an example of a mobile call, and accordingly, the interaction time information includes a call time information and the interaction priority includes a call priority.

For example, the call time information includes a call start time and a call end time.

For example, the call priority information includes a priority of "high", "medium", "low", or the call priority information includes "important call", "non-important call", and so on. The division of priority can be according to actual needs. In some embodiments, the interaction information is predetermined or, alternatively, may be updated in real time.

In some embodiments, the interaction information, i.e., the interaction time information as well as the interaction priority information, is pre-entered by the user, or the interaction time information as well as the interaction priority information is determined according to a user's instruction, such as a user's instruction while driving.

For example, for a predetermined interaction, the interaction information may be entered by the user in advance via a terminal device such as an in-vehicle terminal or a mobile phone of the user, or, alternatively, it may be entered by the user via voice, and the like.

For temporary interactions while driving, the interaction information may, for example, be entered by the user, e.g., by voice, or, alternatively, the interaction information is determined by the mobile interaction device directly in response to the user's operation of accessing the interaction.

In some embodiments, the communication quality information related to the location refers to the communication quality information related to the location, e.g., the communication quality information includes at least one of a road type information between the current location and the destination of the moving vehicle, and a base station distribution information.

In some embodiments, the road type information is information about the type of road that affects the communication quality, for example, the road type information includes at least one of an elevated road, a tunnel, a mountain road, a bridge (on the bridge), a bridge arch (under the bridge), and a strong interfering place. Strong interference place includes, for example, power plants, large substations, electronic production factories, and mining sites and the like.

In these road areas, the impact on communications may be more pronounced due to the characteristics of the road. By avoiding these road, the likelihood of degradation of communication quality and its duration can be reduced.

In some embodiments, the base station distribution information refers to distribution information of base stations used for communication in support of mobile interaction on or near a route between the current location and the destination.

In some embodiments, the base station distribution information may be obtained from a server of a service provider or operator supporting the mobile interaction communication.

In this way, by refining the interaction information and the communication quality information, the considerations when determining a driving route are further refined and the reasonableness of the determined driving route is further improved.

In some embodiments, the road information includes, for example, the range of each road, the number of traffic lights, and the traffic jam condition, and furthermore, the road information may also include traffic abnormality information, such as, for example, traffic control information, accident information, and the like.

In some embodiments, the route determination module 101 may adjust the weight of the communication quality information and the road information in determining the driving route on the basis of at least one of the interaction time information and the interaction priority information, i.e., adjusting the weight of the above two factors on the basis of the interaction time and/or the interaction priority.

For example, increasing the weight of communication quality information when the conference is an important conference or the call is an important call, and increasing the weight of road information when the conference is a non-important conference or the call is a non-important call can further improve the reasonableness of the driving routes.

Another example is to adjust the driving route by taking the interaction start time as a start time for considering the communication quality information when determining the driving route, and taking the interaction end time as an end time for considering the communication quality information when determining the driving route.

In this way, considering the communication quality information during the interaction to determine the driving route and removing the factor of the communication quality information at the end of the interaction to adjust the driving route, for example, adjusting the driving route according to the road information in more cases, which can further improve the reasonableness and flexibility of the driving route.

In some embodiments, the route determination module 101 may also determine a driving route on the basis of the autonomous driving road information, i.e., the route determination module 101 determines a driving route for the moving vehicle where the user is present on the basis of the interaction information, the communication quality information related to the location, the autonomous driving road information, and the road information.

For example, the autonomous driving road information includes road information that allows autonomous driving between the current location and the destination, and for example, the autonomous driving road information includes a proportion of autonomous driving road for each candidate route between the current location and the destination.

In this way, the user experience can be further enhanced as the autonomous driving road facilitates the user's participation in mobile interactions.

In some embodiments, the route determination module 101 may use various path planning algorithms to perform calculations. Such as the Di kstra algorithm, a bi-directional shortest path algorithm, a node contraction based path planning algorithm, a combinatorial navigation algorithm, training a neural network based model, and the like. Embodiments of the present invention do not limit the specific algorithms used.

For example, in some embodiments, the route determination module 101 may first determine a plurality of candidate routes on the basis of a conventional navigation method or a navigation model, and then, among the plurality of candidate paths, select an optimal driving route on the basis of the interaction information as well as the communication quality information; alternatively, select the optimal driving route on the basis of the interaction information, the communication quality information as well as the autonomous driving road information.

However, embodiments of the present invention are not limited to the above, for example, it is also possible to input the interaction information, the communication quality information, and the road information into the model to obtain the optimal driving route directly according to the trained model, or alternatively, input the interaction information, the communication quality information, the autonomous driving road information, and the road information into the model to obtain the optimal driving route.

The communication module 102 in embodiments of the present invention is used to interact information with the exterior of the moving vehicle.

For example, the communication module 102 communicates with external devices such as a base station, a server, other moving vehicle, etc., to enable the exchange of various data between the moving vehicle and the outside, such as driving data, road information, multimedia data, telecommunication data, and video and/or audio data transmitted in mobile interactions.

In some embodiments, as shown in FIG. 1, the mobile interaction device 100 may further comprise: a driving mode switching module 103 that switches the driving mode of the moving vehicle on the basis of the interaction information.

For example, the driving modes may include a sporty style driving mode as well as a smooth style driving mode, and additionally with include an autonomous driving mode, an assisted driving mode, a cruise control mode, and the like.

For example, switching to a smooth style driving mode during mobile interactions, avoiding or reducing driving behaviors such as rapid acceleration, rapid deceleration, and rapid braking, can further enhance the interaction effect and user experience.

For example, switching to an autonomous driving mode during the mobile interaction and if the current road supports autonomous driving, or, switching to an assisted driving mode during the mobile interaction, in such a way that it is favorable for the user to take part in the mobile interaction, and therefore can further enhance the user experience.

In some embodiments, as shown in FIG. 1, the mobile interaction device 100 may further comprise: an interacting mode switching module 104 that switches the interaction mode on the basis of the current communication quality of the communication module and/or the prediction result of the communication quality of the communication module 102. For example, interaction modes include video interaction and audio interaction.

For example, automatically switching the video interaction mode to audio interaction mode when the communication quality is poor or is predicted to be poor can reduce the possibility of sudden interruption or severe lag in the interaction and further enhance the user experience.

For example, a trend of the communication quality can be predicted according to road type information of the roadway to be passed and base station distribution information, and the switching of the interaction mode will be performed when the communication quality is predicted to be about to deteriorate. The prediction may be achieved by various prediction models, for example, a trained neural network model.

In some embodiments, as shown in FIG. 1, the mobile interaction device 100 may further comprise: a proposal module 105 which sends a proposal message to attendees other than the user on the basis of the current communication quality of the communication module 102 and/or the prediction result of the communication quality of the communication module 102.

For example, the proposal message includes: at least one of an interaction mode switching, an interaction interruption, an interaction interruption reason, and an estimated recovery time.

This further enhances the user experience by being able to propose other attendees in case of interaction exceptions or predictions of possible exceptions.

For example, similar to the above, a trend of the communication quality can be predicted according to the road type information of the road to be passed and the base station distribution information, and the proposal message will be generated and sent when it is predicted that the communication quality is about to be worse. The prediction may be implemented by various prediction models, for example, a trained neural network model.

In some embodiments, the proposal message may be sent via the communication module 102, e.g., via a base station to the terminal devices of other attendees, or, via V2V communication to attendees in other moving vehicles, or, via the network to an interaction server which sends it to other attendees of the interaction.

In some embodiments, the proposal message may be presented by means of a voice announcement and/or a message display.

In some embodiments, as shown in FIG. 1, the mobile interaction device 100 may further comprise: a device adjustment module 106 which adjusts the device for interaction in the moving vehicle on the basis of the interaction information.

For example, the device for interaction includes: at least one of a seat, a window, a curtain, a light, a display, a projector, a head up display (HUD), a speaker, a microphone and a camera.

In this way, it can provide all-round support for mobile interaction and further enhance the interaction effect and user experience.

For example, the angle and position of the backrest of the seat can be adjusted to facilitate user participation in mobile interactions.

For example, adjusting the transparency of the windows, or, controlling the curtains to cover the windows, so that privacy and security of the interaction can be ensured.

For example, turn on lightings or ambient lighting for users attending a conference to enhance the interaction effect.

For example, a display of an in-vehicle terminal or a head up display (HUD) is provided to the driver to participate in the mobile interaction; or a rear display is provided to the rear passenger to participate in the mobile interaction.

For example, three-dimensional projection inside the vehicle or projection display on the windows to realize the display of interaction content can further improve the interaction effect.

For example, speakers, microphones, and in-vehicle cameras are adapted to provide support for interaction modes in video and audio.

In the following, applications of the mobile interaction device of the present invention are illustrated by way of specific examples. However, this should not be construed as a limitation of the application scenarios of the present invention.

Figure 2:
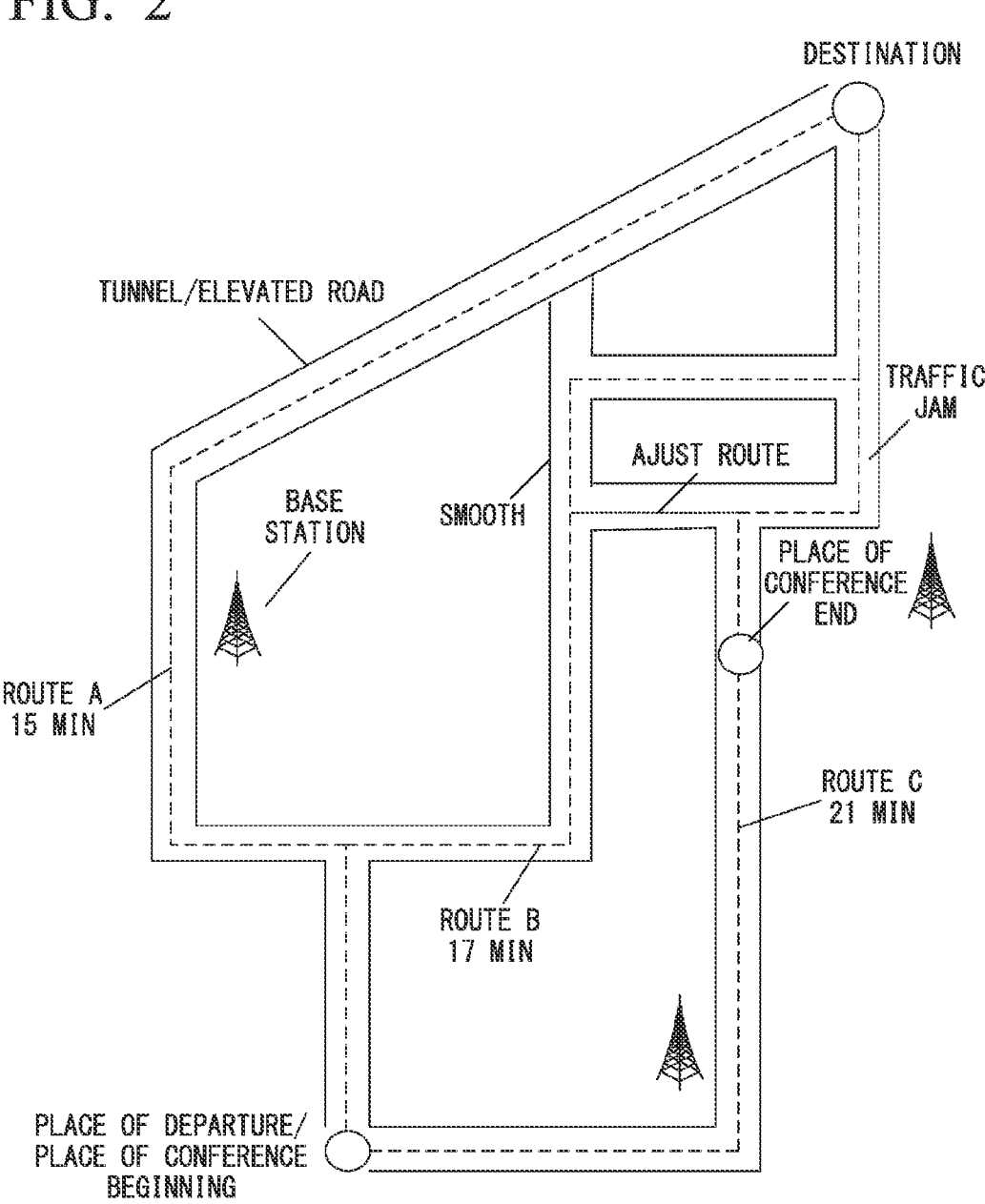
FIG. 2 is a schematic diagram of an application scenario of the mobile interaction device of embodiment 1 of the present invention.

FIG. 2 is a schematic diagram of an application scenario of the mobile interaction device of embodiment 1 of the present invention. In this scenario, a mobile conference is illustrated as an example, but a mobile communication or other information interactions are also applicable to this or similar scenarios.

As shown in FIG. 2, there are three candidate routes from the departure location to the destination, i.e., Route A, Route B, and Route C. According to the factors such as the length of the road, the number of traffic lights, and the traffic jam condition, the estimated time required for Route A is 15 minutes, the estimated time required for Route B is 17 minutes, and the estimated time required for Route C is 21 minutes. If road length and traffic jam condition are the only considerations, route A is generally chosen; however, there is a possibility that the user may need to attend a mobile conference while on the road.

For example, for a predetermined conference, the user inputs the conference information before departure, the conference information is sent, for example, to the vehicle-mounted terminal via the user's terminal, or, the conference information is inputted directly into the vehicle-mounted terminal; the conference starts, for example, in 2 minutes after departure, and the conference lasts, for example, about 15 minutes. Therefore, taking into account both the conference effect and the communication efficiency, the mobile conference device of the embodiment of the present invention takes into account the communication quality information of the road and the conference information when determining the driving route, for example, as shown in FIG. 2, although Route A takes the shortest time, there is a long section of the tunnel or elevated road to be passed, which may have a greater impact on the conference effect; Route B is farther away from the base station, and the communication quality may not be good, but the overall communication quality may not be good, but the overall communication quality is stronger than that of Route A. Route C requires longer time, but the overall communication quality is the best, so Route C or Route B can be considered as the driving route for mobile conferences during travelling.

Driving routes can be further determined and adjusted according to the priority of the conference and the time of the conference.

For example, for a high-priority conference, Route C can be chosen as the driving route to ensure the effectiveness of the conference; for a low-priority conference, Route B can also be chosen as the driving route to strike a balance between traffic efficiency and the effectiveness of the conference.

In addition, there is a possibility that the conference ends or will end early while travelling, for example, if the conference ends early on the selected route C as shown in FIG. 2, and the road that will be passed after place of termination of the conference on route C is a traffic jammed road, then the driving route can be adjusted by making a left turn at the intersection and continuing to drive along route B.

For another example, for a temporary conference while driving, as shown in FIG. 2, e.g., if the user accesses the temporary conference at the location where the conference is to start, the mobile conference device of the embodiment of the present invention selects route C as the driving route according to a principle similar to the example above. In addition, similar to the above example, the conference may end early, and thus the driving route may also be adjusted according to the time and location of the end of the conference.

Additionally, in each of the above examples, the driving route may be further determined in conjunction with the information of the autonomous driving road.

In addition, in each of the above examples, switching of interaction modes and sending of proposal messages to other attendees, etc., may also be carried out when the communication quality is poor or is expected to be poor while driving.

As can be seen from the above embodiments, the driving route of the moving vehicle in which the user is present is determined on the basis of the interaction information, the communication quality information related to the location, and the road information, i.e., in determining the driving route during driving, the communication quality and the road information are taken into account, and the interaction information is combined, so that the interaction effect during the mobile interaction can be ensured while taking into account the traffic efficiency, etc., thereby providing the user with a reasonable driving route suitable for mobile interaction and improving the user experience.

Embodiment 2

Embodiment 2 of the present invention provides a terminal device for a moving vehicle, the terminal device comprising the mobile interaction device described in Embodiment 1, the details of which can be found in Embodiment 1, and the repetitions will not be specified.

A terminal device of a moving vehicle is a terminal device provided in a moving vehicle, for example, an in-vehicle terminal provided in a vehicle.

Figure 3:
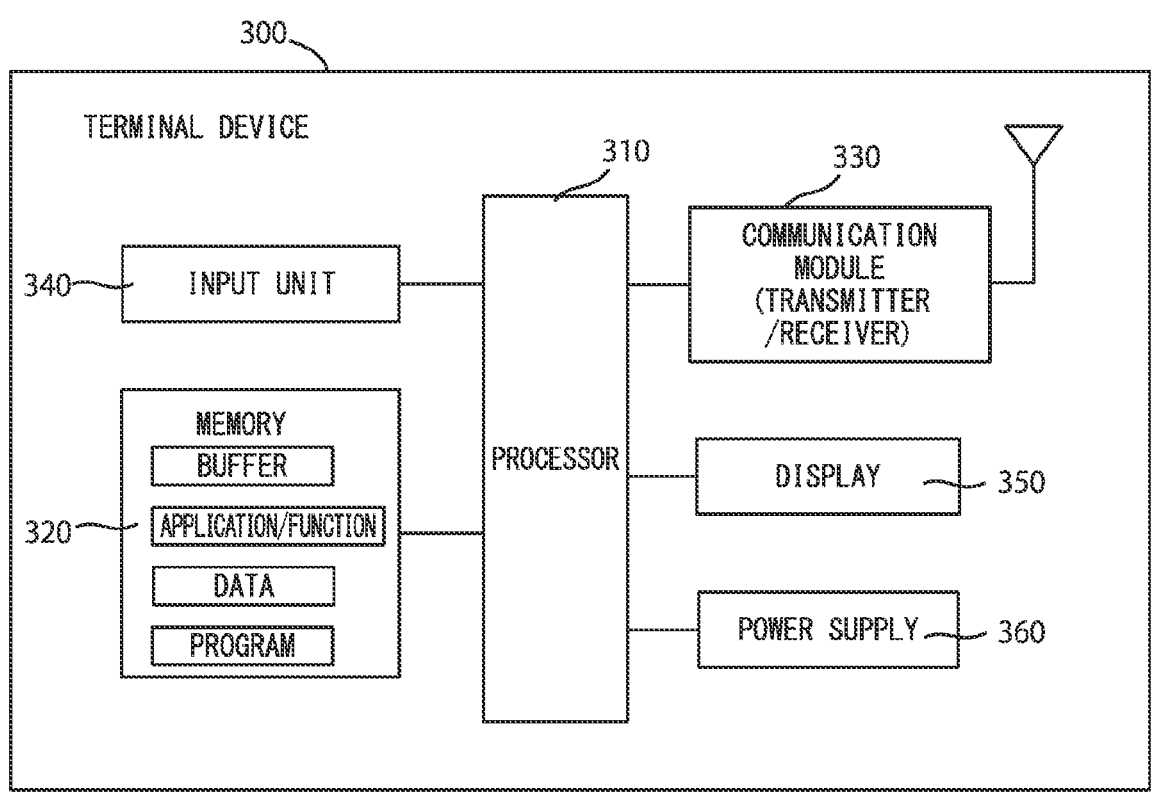
FIG. 3 is a schematic block diagram of a system configuration of a terminal device of a moving vehicle of embodiment 2 of the present invention.

FIG. 3 is a schematic block diagram of a system configuration of a terminal device of a moving vehicle of embodiment 2 of the present invention. As shown in FIG. 3, the terminal device 300 includes a processor 310 and a memory 320; the memory 320 is coupled to the processor 310. It is worth noting that the figure is exemplary; other types of structures may be used to supplement or replace the structure for telecommunication functionality or other functions.

In one embodiment, all or part of the functionality of the mobile interaction device may be integrated into the processor 310.

For example, the processor 310 is configured to: determine a driving route of the moving vehicle in which the user is present, on the basis of the interaction information, the communication quality information related to the location, and the road information.

In another embodiment, the mobile interaction device may be configured separately from the processor 310, e.g., the mobile interaction device may be configured as a chip connected to the processor 310, and the functionality of the mobile interaction device may be realized through the control of the processor 310.

As shown in FIG. 3, the terminal device 300 may also include: a communication module 330, an input unit 340, a display 350, and a power supply 360. It is worth noting that the terminal device 300 does not have to include all of the components shown in FIG. 3; furthermore, the terminal device 300 may also include components not shown in FIG. 3, and reference may be made to the relevant technology.

As shown in FIG. 3, the processor 310, sometimes referred to as a controller or an operating control, may include a microprocessor or other processor unit and/or a logic unit that receives inputs and controls the operation of the various components of the terminal device 300.

The memory 320, for example, may be one or more of a cache, flash memory, hard drive, removable medium, volatile memory, non-volatile memory, or other suitable device. Various data may be stored, and in addition, a program for executing the information may be stored. And the processor 310 may execute such a program stored in the memory 320 for information storage or processing, etc. The functions of the other components are similar to the existing ones and will not be repeated herein. The components of the terminal device 300 may be implemented by dedicated hardware, firmware, software, or a combination thereof, without departing from the scope of the present invention.

As can be seen from the above embodiment, the driving route of the moving vehicle in which the user is present is determined on the basis of the interaction information, the communication quality information related to the location, and the road information, i.e., when determining the driving route, the communication quality and the road information during the driving process are taken into account in combination with the interaction information, and thus the interaction effect during the mobile interaction is ensured, and factors such as the traffic efficiency are taken into account, so as to provide the user with a driving route that is suitable for conducting the mobile interaction and is reasonable, and to enhance the user's experience.

Embodiment 3

Embodiment 3 of the present invention provides a mobile interaction system which corresponds to the mobile interaction device as described in Embodiment 1 and the terminal device as described in Embodiment 2, and the repetitions will not be specified.

Figure 4:
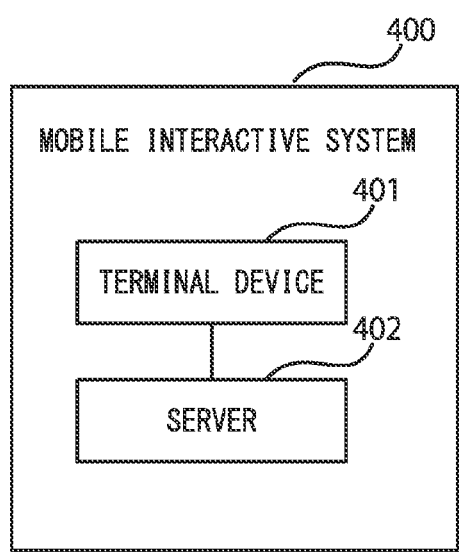
FIG. 4 is a schematic diagram of the construction of one embodiment of the mobile interaction system of embodiment 3 of the present invention.
Figure 5:
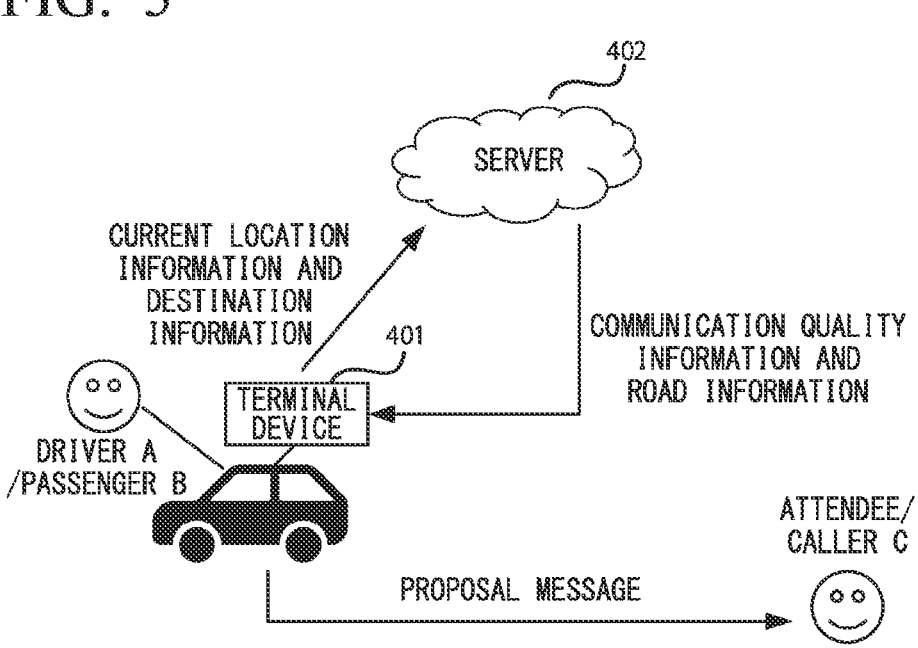
FIG. 5 is an information interaction diagram of one embodiment of the mobile interaction system of embodiment 3 of the present invention.

FIG. 4 is a schematic diagram of the construction of one embodiment of the mobile interaction system of embodiment 3 of the present invention, and FIG. 5 is an information interaction diagram of one embodiment of the mobile interaction system of embodiment 3 of the present invention.

As shown in FIGS. 4 and 5, the mobile interaction system 400 includes a terminal device 401 of a moving vehicle (e.g., the vehicle in FIG. 5) and a server 402, wherein the terminal device 401 of the moving vehicle uploads the current location information and the destination information to the server 402, and the server 402 determines the communication quality information related to the location and the road information on the basis of the current location information and the destination information of the moving vehicle and sends it to the terminal device 401 of the moving vehicle, and the terminal device 401 of the moving vehicle determines a driving route of the moving vehicle in which the user is present on the basis of the interaction information, the communication quality information related to the location, and the road information.

In addition, a proposal message can also be sent to other participants or caller C other than driver A or passenger B as participants or callers, when the quality of communication becomes poor or is predicted to become poor.

In some embodiments, the terminal device 401 is, for example, the terminal device shown in FIG. 3, and the server 402 is, for example, a cloud server. At least one of, for example, a server of a map service provider, an interaction service provider, and a communication carrier.

Figure 6:
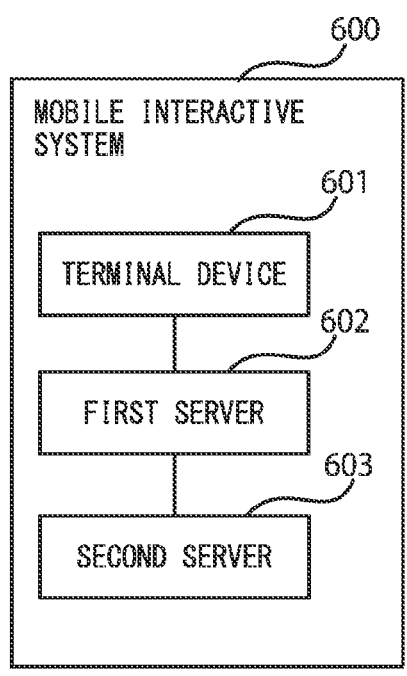
FIG. 6 is a schematic diagram of the configuration of an alternative embodiment of the mobile interaction system of embodiment 3 of the present invention.
Figure 7:
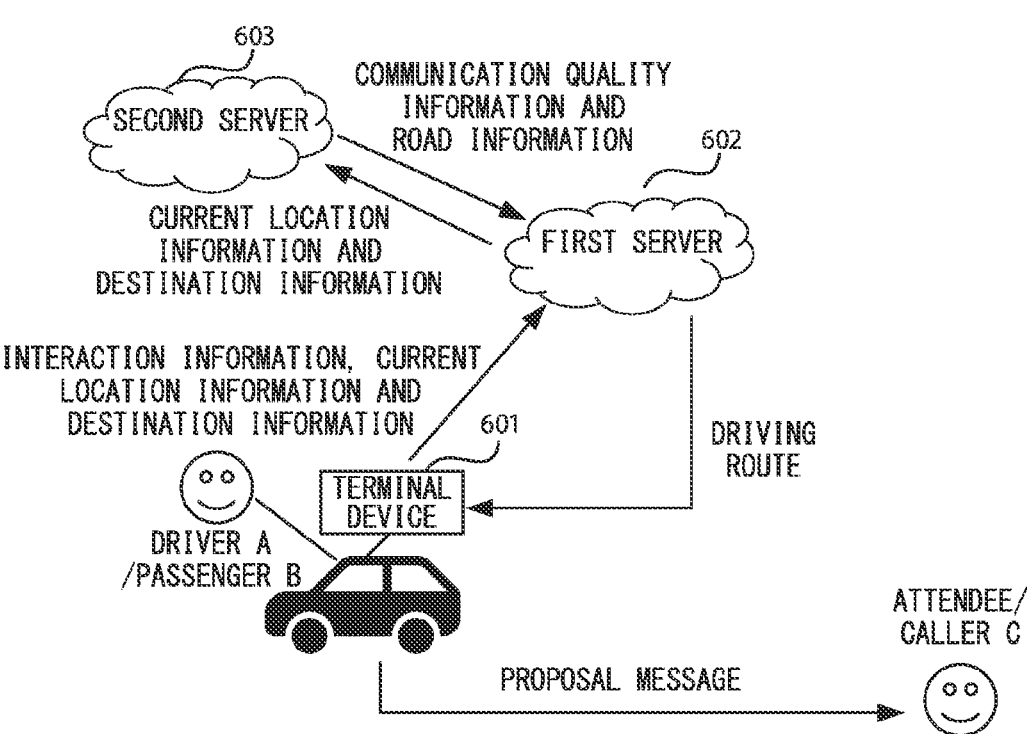
FIG. 7 is an information interaction diagram of an alternative embodiment of the mobile interaction system of embodiment 3 of the present invention.

FIG. 6 is a schematic diagram of the configuration of an alternative embodiment of the mobile interaction system of embodiment 3 of the present invention, and FIG. 7 is an information interaction diagram of an alternative embodiment of the mobile interaction system of embodiment 3 of the present invention.

As shown in FIGS. 6 and 7, the mobile interaction system 600 includes a terminal device 601 of a moving vehicle (e.g., the vehicle in FIG. 7), a first server 602, and a second server 603. The terminal device 601 of the moving vehicle uploads the interaction information, the current location information, and the destination information to the first server 602; the first server 602 sends the current location information and the destination information of the moving vehicle to the second server 603; and the second server 603 determines, on the basis of the current location information and the destination information of the moving vehicle, the communication quality information related to the location and the road information, and sends them to the first server 602. The first server 602 determines a driving route of the moving vehicle where the user is present on the basis of the interaction information, the communication quality information related to the location and the road information, and sends the driving route to the terminal device 601 for moving vehicle.

In addition, when the communication quality becomes poor or is predicted to become poor, a proposal message may be sent to the participant C other than the driver A or the passenger B who are attendees of the conference.

In some embodiments, the terminal device 601 is, for example, the terminal device shown in FIG. 3, and the first server 602 and the second server 603 are, for example, cloud servers. The first server 602 is, for example, a server of a vehicle manufacturer, and the second server 603 is at least one of a server of a map service provider, an interaction service provider, and a communication carrier.

As can be seen from the above embodiments, a driving route of the moving vehicle in which the user is present is determined on the basis of the interaction information, the communication quality information related to the location, and the road information, i.e., in determining the driving route, the communication quality and the road information during driving are taken into account, and the interaction information is combined, so that the interaction effect during the mobile interaction can be ensured, and factors such as the traffic efficiency can be taken into account, and so on. Thus, it can ensure the interaction effect during mobile interaction and take into account factors such as traffic efficiency, so as to provide the user with a reasonable driving route suitable for mobile interaction and improve the user's experience.

The above detailed description of embodiments of the present invention with reference to the accompanying drawings indicates the manner in which the principles of the present invention may be employed. It should be understood, however, that the embodiment of the present invention is not limited to the manner of the above embodiments, but also includes all changes, modifications and the like which do not depart from the scope of the main idea of the present invention.

What is claimed is:

1. A mobile interaction device, comprising:
a processor configured to:
determine a driving route of a moving vehicle on which a user is present based on interaction information, communication quality information related to a location, and road information;
communicate interaction information with an external device of the moving vehicle,
the interaction information includes interaction time information which includes at least one of an interaction start time and an interaction end time and interaction priority information which includes divisions of a priority on the interaction information,
determine the driving route while adjusting a weight of the communication quality information and the road information based on the interaction time information and the interaction priority information, and
based on the interaction information, the communication quality information, the road information, and the driving route, establishing an interaction between the user travelling in the moving vehicle and a group of user identities attending the interaction from one or more remote location, wherein the interaction is at least one of a video conference call and an audio conference call.

2. The mobile interaction device according to the claim 1, wherein,
the interaction information includes interaction time information which further includes at least a start time and an end time of the interaction information,
the interaction priority information is determined based on at least the user, and
the communication quality information includes at least one of road type information between a current location and a destination of the moving vehicle, and base station distribution information.

3. The mobile interaction device according to the claim 2, wherein,
the road type information includes at least one of an elevated road, a tunnel, a mountain road, a bridge, a bridge arch, and a place associated with strong interference,
wherein the strong interference impacts communication of the interaction information.

4. The mobile interaction device according to the claim 2, wherein,
the processor is further configured to adjust the weight of the communication quality information and the road information in determining the driving route based on at least the interaction time information.

5. The mobile interaction device according to claim 1, wherein,

16 the processor is further configure to determine the driving route on the basis of autonomous driving road information.

6. The mobile interaction device according to claim 1, wherein the processor is further configured to:
switch a driving mode of the moving vehicle based on the interaction information.

7. The mobile interaction device according to claim 1, wherein the processor is further configured to:
switch an interaction mode based on a current communication quality of the communication module and/or a prediction result of a communication quality of the communication module.

8. The mobile interaction device according to claim 1, wherein the processor is further configured to:
send a proposal message to attendees other than the user based on a current communication quality and/or a prediction result of a communication quality, wherein,
the proposal message includes: at least one of a switching of an interaction mode, an interaction interruption, an interaction interruption reason, and an estimated recovery time.

9. The mobile interaction device according to claim 1, wherein the processor is further configured to:
adjust a device for interaction in the moving vehicle based on the interaction information, wherein,
the device for interaction includes: at least one of a seat, a window, a curtain, a light, a display, a projector, a head up display (HUD), a speaker, a microphone and a camera.

10. A terminal device for a moving vehicle, comprising:
the mobile interaction device according to claim 1.

11. The mobile interaction device according to claim 1, wherein
when the interaction information is indicated to be important by the interaction priority information, the processor is configured to increase the weight of the communication quality information and determine the driving route so that the communication quality becomes greater than before the weight of the communication quality information was increased, and
when the interaction information is indicated to be not important by the interaction priority information, the processor is configured to increase the weight of the road information and determine the driving route so that a driving time becomes less than before the weight of the road information was increased.

12. The mobile interaction device according to the claim 1,
wherein the interaction time information includes the interaction start time and the interaction end time,
the processor is configured to:
increase the weight of the communication quality information and determine the driving route so that the communication quality becomes greater than before the weight of the communication quality information was increased when the driving route is determined between the interaction start time and the interaction end time, and
increase the weight of the road information and determine the driving route so that a driving time becomes less than before the weight of the road information was increased when the driving route is determined other than between the interaction start time and the interaction end time.

13. A mobile interaction system, comprising a terminal device for a moving vehicle, and a server, wherein, the terminal device for a moving vehicle uploads current location information and destination information to the server;

the server determines communication quality information related to a location and road information based on the current location information and the destination information of the moving vehicle and sends the communication quality information and the road information to the terminal device for the moving vehicle, the terminal device for a moving vehicle determines a driving route of the moving vehicle on which a user is present based on interaction information, the communication quality information related to the location and the road information, wherein the interaction information includes interaction time information which includes at least one of an interaction start time and an interaction end time and interaction priority information which includes divisions of a priority on the interaction information, wherein the driving route is determined while adjusting a weight of the communication quality information and the road information based on the interaction time information and the interaction priority information, and wherein, based on the interaction information, the communication quality information, the road information, and the driving route, the terminal device establishes an interaction between the user travelling in the moving vehicle and a group of user identities attending the interaction from one or more remote location, wherein the interaction is at least one of a video conference call and an audio conference call.

14. A mobile interaction system, comprising a terminal device for moving vehicle, a first server and a second server, the terminal device for a moving vehicle uploads interaction information, current location information and destination information to the first server;

the first server sends the current location information and the destination information of the moving vehicle to the second server, wherein the second server determines communication quality information related to a location and road information based on the current location information and the destination information of the moving vehicle and sends the communication quality information and the road information to the first server, the first server determines a driving route of the moving vehicle on which a user is present based on the interaction information, the communication quality information related to the location and the road information and sends the driving route to the terminal device for the moving vehicle, wherein the interaction information includes interaction time information which includes at least one of an interaction start time and an interaction end time and interaction priority information which includes divisions of a priority on the interaction information, wherein the driving route is determined while adjusting a weight of the communication quality information and the road information based on the interaction time information and the interaction priority information, and wherein, based on the interaction information, the communication quality information, the road information, and the driving route, the terminal device establishes an interaction between the user travelling in the moving vehicle and a group of user identities attending the interaction from one or more remote location, wherein the interaction is at least one of a video conference call and an audio conference call.

* * * * *